March 22, 1932.  E. L. AMBLE  1,850,255
HOG HOLDER AND RELEASE
Filed April 10, 1930
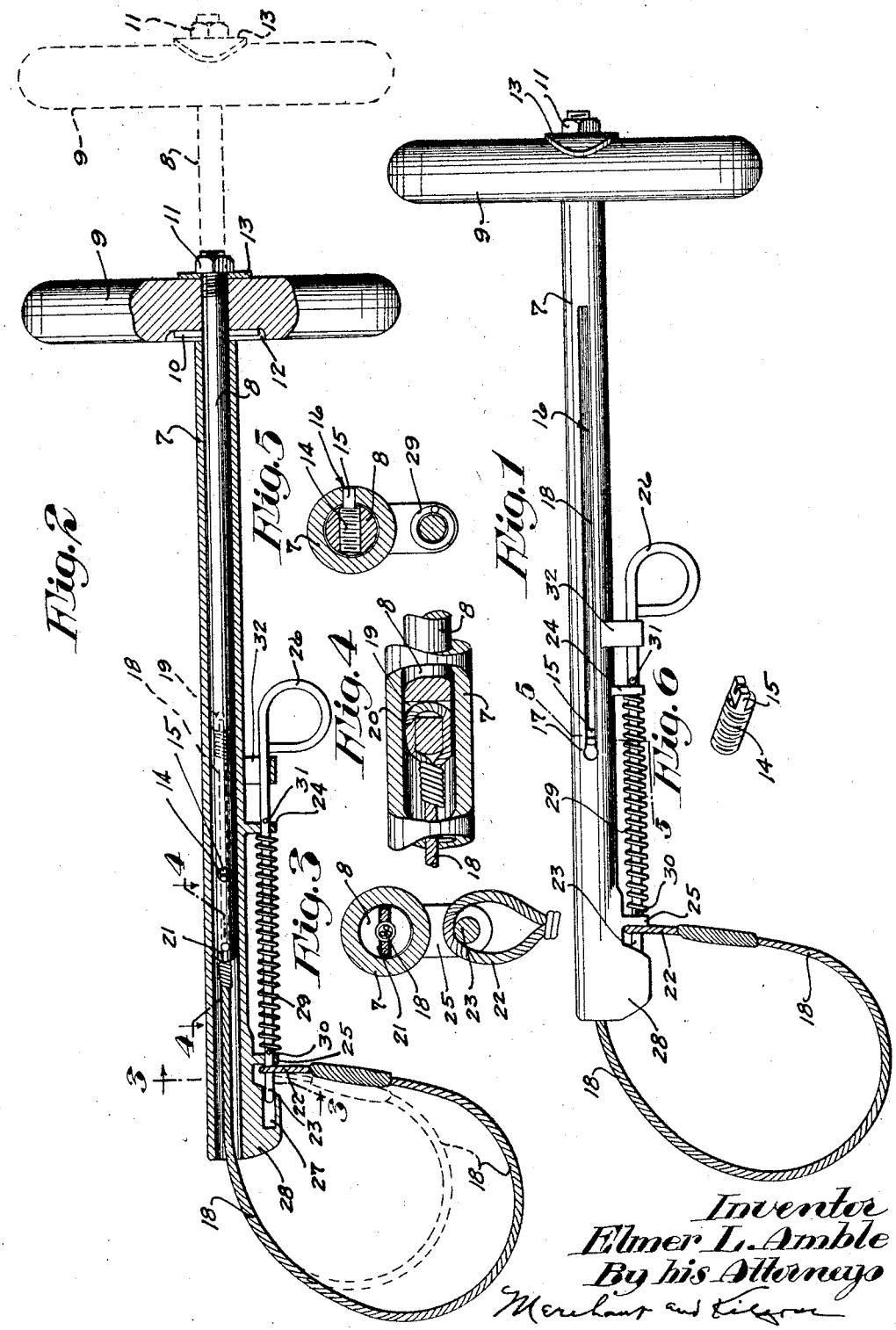
Inventor
Elmer L. Amble
By his Attorneys Patented Mar. 22, 1932

1,850,255

UNITED STATES PATENT OFFICE

ELMER L. AMBLE, OF FROST, MINNESOTA

HOG HOLDER AND RELEASE

Application filed April 10, 1930. Serial No. 443,085.

My invention has for its object to provide a simple and highly efficient hog holder and release and, to this end, it consists of the novel devices and combinations of devices hereinafter described and defined in the claims.

In the accompanying drawings which illustrate the invention, like characters indicate like parts throughout the several views.

Referring to the drawings:

Fig. 1 is a side elevation of the invention;

Fig. 2 is a view corresponding to Fig. 1 with the exception that certain parts are shown in longitudinal central section and other parts are shown in different positions by means of broken lines;

Fig. 3 is a view principally in transverse section taken on the line 3—3 of Fig. 2, on an enlarged scale;

Fig. 4 is a fragmentary detail view, with some parts sectioned on the line 4—4 of Fig. 3, on an enlarged scale;

Fig. 5 is a view principally in transverse section taken on the line 5—5 of Fig. 1, on an enlarged scale; and Fig. 6 is a perspective view of the screw stud.

The numeral 7 indicates a relatively long tubular body in which is slidably mounted a stem 8 having on its outer end a transverse handle 9. Said stem 8 extends through a transverse bore in the handle 9, intermediate of its ends, and is held therein against endwise movement by a pin 10 and a nut 11 in opposing relation. The pin 10 extends transversely through the stem 8 and lies in a longitudinal groove 12 in the inner face of the handle 9 and the nut 11 has screw-threaded engagement with said stem.

A washer 13 is interposed between the handle 9 and nut 11 and is transversely curved to fit around said handle. Obviously, the pin 10, in the groove 12, holds the handle 9 from turning about the stem 8. The projecting movement of the stem 8 into the body 7 is limited by the engagement of the handle 9 with the adjacent end of the body 7 and when in this position the inner end of said stem is considerably inward from the other end of the body 7.

To hold the stem 8 from turning in the body 7, there is provided a stud 14 having a flat head 15 which slidably works in a longitudinal slot 16 in the body 7. The stud 14 is screwed into a transverse bore in the stem 8, see Fig. 5, and the width of the slot 16 is considerably less than the diameter of said stud to prevent the removal of said stud. Formed in the outer end of the slot 16, beyond the normal position of the stud 14 in said slot, is a bore 17 having a diameter slightly greater than that of said stud. By removing the handle 9 the stem 8 may be moved endwise in the body 7 to bring the stud 14 into alignment with the bore 17 and permit its removal thereof in disassembling the device.

One end of a snare 18 is attached to the end of the stem 8 within the body 7 and which snare, as shown, is a wire cable but may be of any other suitable flexible material. The snare 18 is attached to the end of the stem 8, within the body 7, by threading one end thereof through an eye 19 in said stem and then twisting the same about the snare 18 to form a loop 20. The sides of the loop 20 lie in diametrically opposite longitudinal grooves 21 in the stem 8 to bring the same into positions in which they will freely slide in the body 7. On the other or outer end of the snare 18 is a loop 22.

In case it is necessary to replace the snare 18 with another new one, it is only necessary to remove the handle 9, move the stem 8 endwise in the body 7 to align the stud 14 with the bore 17, remove said stud with a screw driver to release the stem 8 and permit its removal from the body 7.

To hold the snare 18 in an operative position, there is provided a latch in the form of a lock bolt 23 arranged to be inserted through the loop 22 in said snare. This lock bolt 23 is mounted for endwise sliding movement in a pair of longitudinally spaced radial bearing lugs 24 and 25 on the body 7. The inner end of the lock bolt 23 is shaped to form a finger piece 26 and its other end is arranged to be projected into a lock seat 27 in an abutment 28 on the body 7 outward of the bearing lug 25. A coiled spring 29, encircling the lock bolt 23 between the bearing lugs 24 and 25, is compressed between the bearing 24 and a transverse lock pin 30 in said bolt. This spring 29 is under strain to yieldingly and normally hold the outer end of the lock bolt 23 projected into the lock seat 27. A stop pin 31, extending transversely through the lock bolt 23, is arranged to engage the bearing lug 24 to limit the projecting movement of the lock bolt 23 and to engage a stop lug 32 on the body 7 to limit the retracting movement of said bolt. The stop lug 32 is U-shaped and the lock bolt 23 works therethrough.

To set the snare 18, the lock bolt 23 is retracted, the loop 22 inserted between the bearing lug 25 and the abutment 28 in alignment with the bolt 23 and said lock bolt released to project the same through the loop 22 and into the lock seat 27. The inner end of the abutment 28 is cut oblique to facilitate the release of the loop 22 from the lock bolt 23.

To catch a hog with the hog holder and release, the snare 18 is set, as shown, with the handle 9 in its innermost position to expand the loop 22 to its greatest diameter. The snare 18 is then passed around the hog's snout and contracted thereon by pulling on the handle 9 and releasing the body 7 to permit a running movement of the stem 8 and snare 18 through said body. It is evident that the harder a hog pulls on the snare, the tighter the snare 18 will be contracted onto his snout.

To release a hog held by the driver, it is only necessary to retract the lock bolt 23 which withdraws the same from its lock seat 27 and away from the abutment 28 a distance sufficient to permit the loop 22 to slip from said lock bolt under the strain on the snare 18.

Ordinarily the effort of a hog, to get away from the person trying to catch it, will facilitate the operation of the driver and in which case it is only necessary to place the snare 18 around the animal's snout and hold the handle 9, the pull of the hog on the snare 18 will contract the same.

The end of the abutment 28, within the snare 18, is made blunt so as to not cut an animal and if advisable, a piece of rubber tubing may be placed around the snare 18 to prevent said snare from cutting the animal.

What I claim is:

1. A device of the class described comprising a body, a snare guided by said body for running movement, a handle on one end of the snare, said snare having a loop on its other end, an abutment on the body having a lock seat, and a lock bolt slidably mounted on the body and arranged to be projected through said loop and into the lock seat for releasably holding the snare set.

2. The structure defined in claim 1 in which the lock bolt is spring projected.

3. In a device of the class described, a tubular body, a handle-equipped stem extending into said body, a snare, one end of which is attached to the stem within the body and having a loop on its other end, a latch on the body engageable with said loop for releasably holding the snare set, and means for holding the stem against rotation in the body and limiting its projecting and retracting movements therein, said means including a radial screw in the stem having a head of a width less than that of its body and a longitudinally extended slot in the body into which said head extends to hold the screw from turning in the stem, the stem from turning in the body and for engagement with the body at the ends of said slot to limit the projecting and retracting movements of the stem in the body, said body at a given point in the slot having a bore through which the screw may be removed from the stem or applied thereto.

In testimony whereof I affix my signature.

ELMER L. AMBLE.